Nov. 25, 1969   H. MULTHOPP   3,480,235
MULTIPLE SLOTTED AIR-FOIL SYSTEM FOR AIRCRAFT
Filed Feb. 29, 1968   4 Sheets-Sheet 1

INVENTOR
HANS MULTHOPP

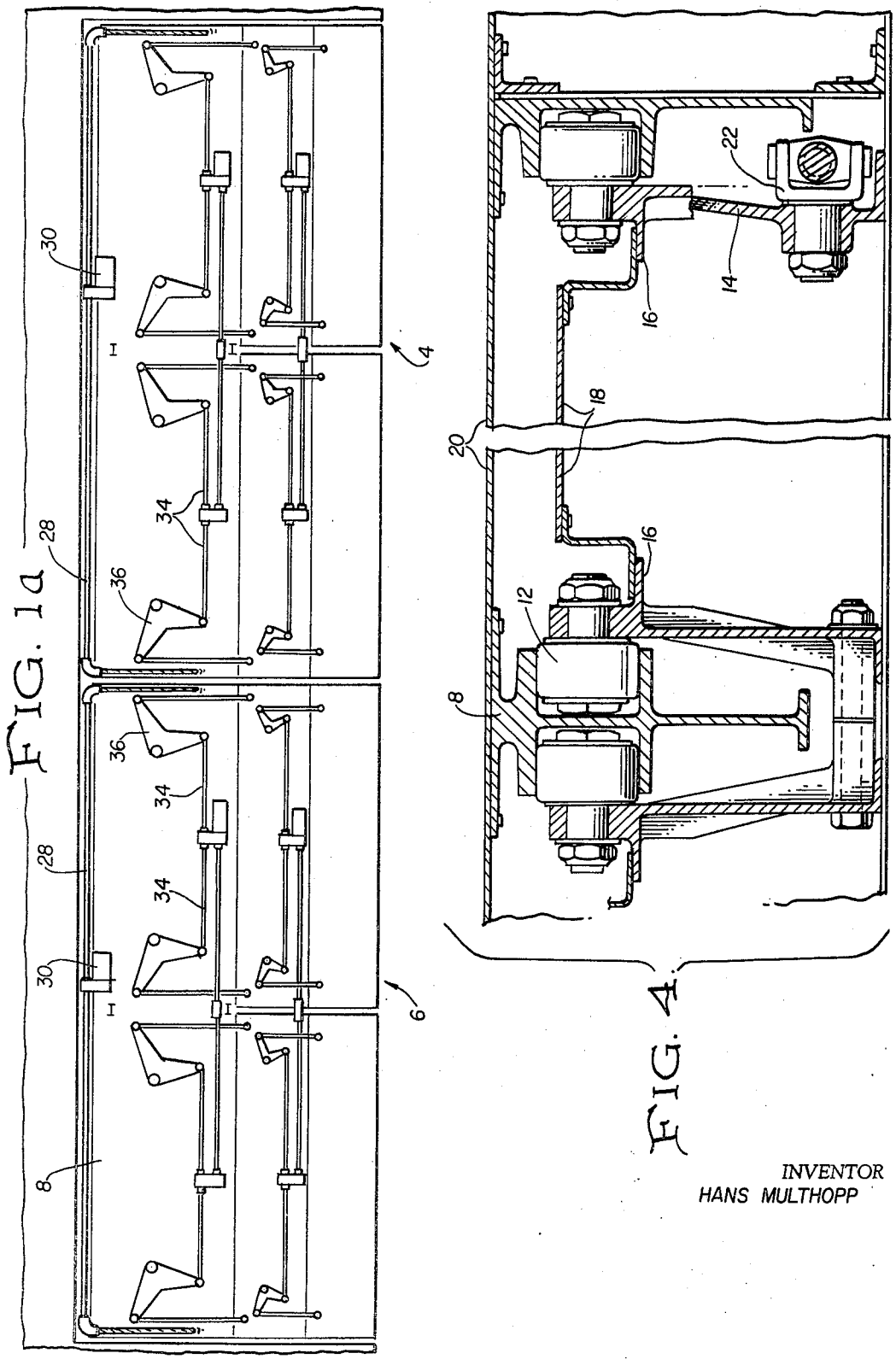

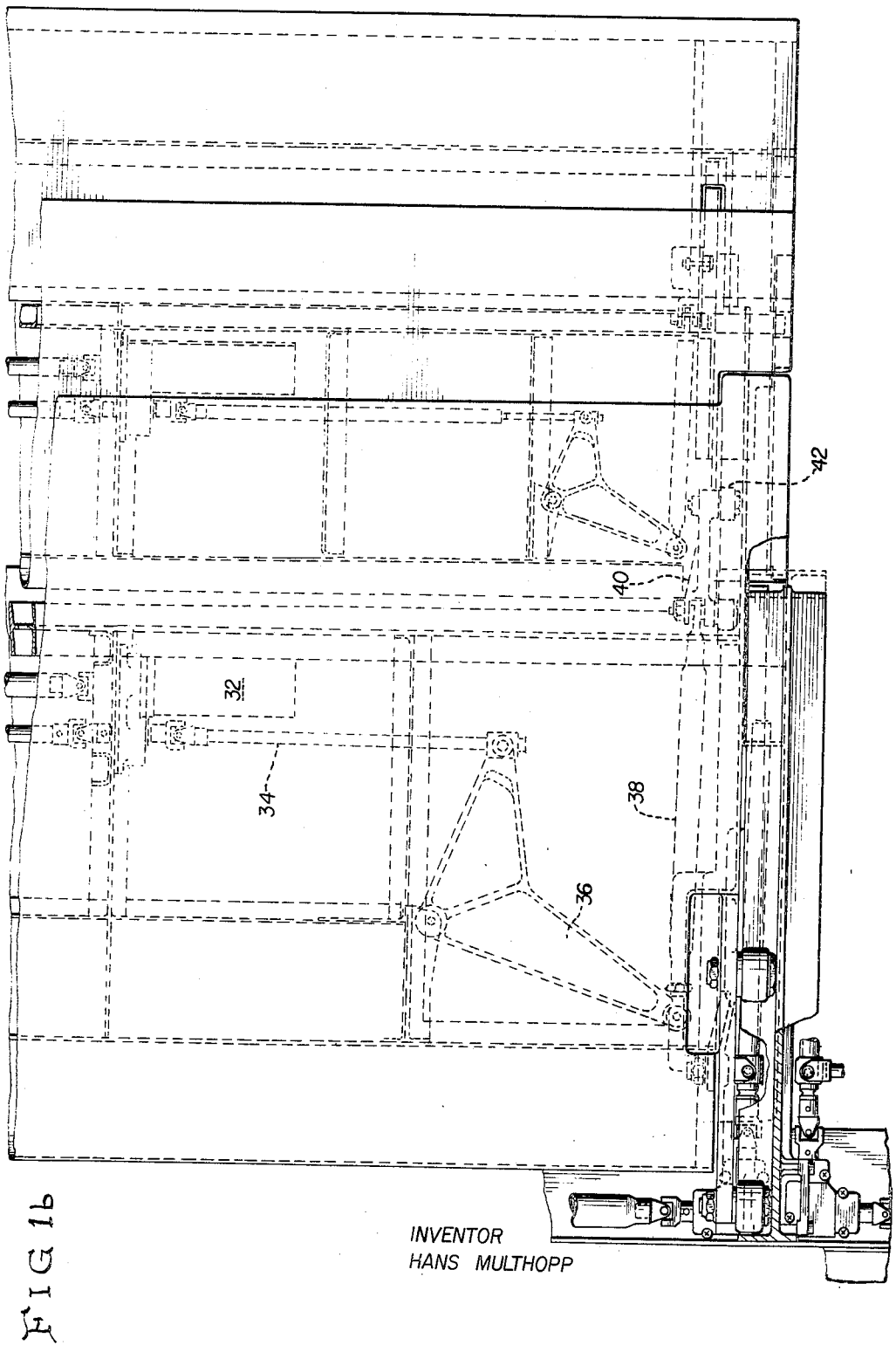

Nov. 25, 1969     H. MULTHOPP     3,480,235
MULTIPLE SLOTTED AIR-FOIL SYSTEM FOR AIRCRAFT
Filed Feb. 29, 1968     4 Sheets-Sheet 4
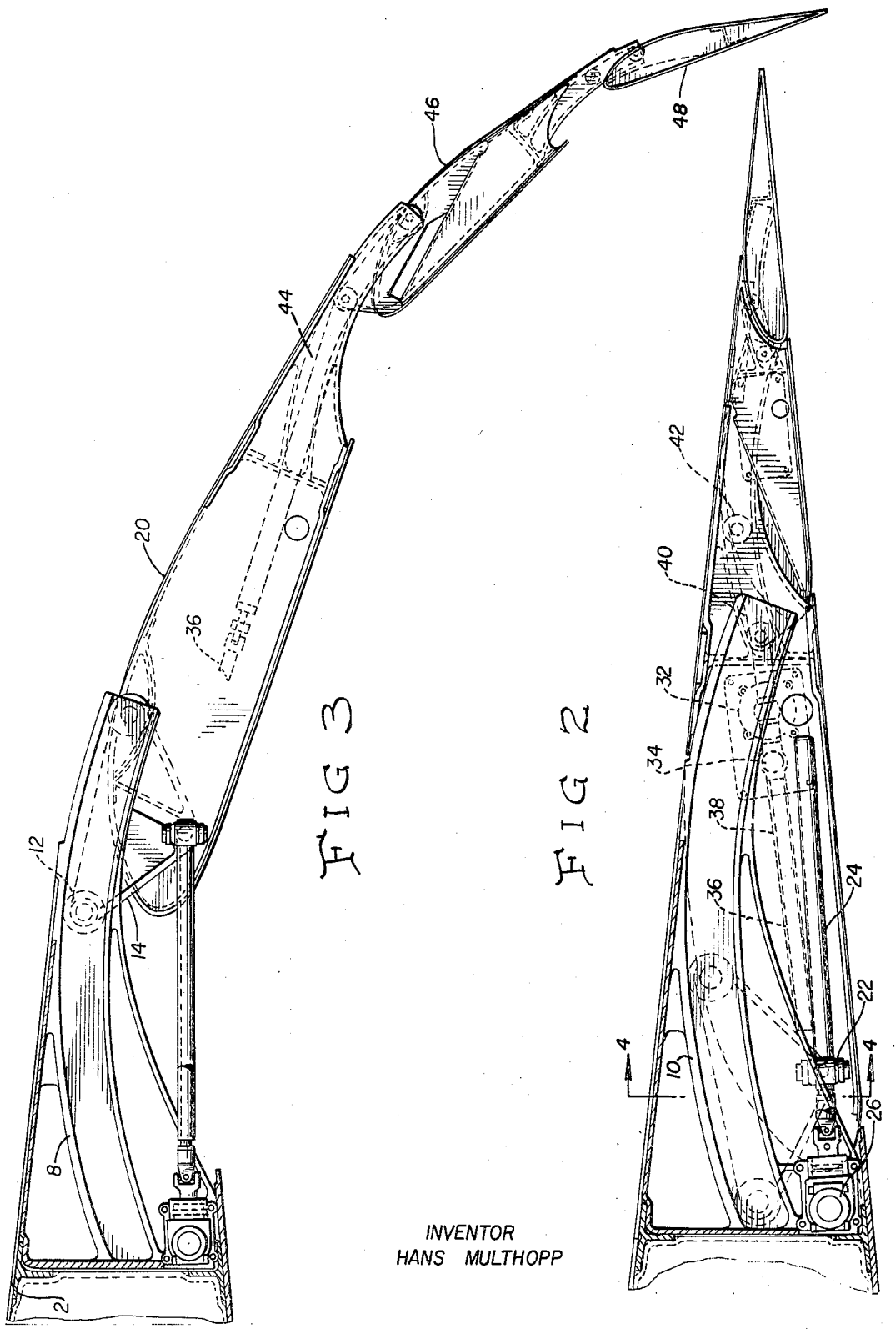
INVENTOR
HANS MULTHOPP United States Patent Office 3,480,235
Patented Nov. 25, 1969

3,480,235
MULTIPLE SLOTTED AIR-FOIL SYSTEM FOR AIRCRAFT
Hans Multhopp, Baltimore, Md., assignor to Syscon, Inc., Baltimore, Md., a corporation of Maryland
Filed Feb. 29, 1968, Ser. No. 709,380
Int. Cl. B64c 3/38
U.S. Cl. 244—42                   2 Claims

ABSTRACT OF THE DISCLOSURE

A multiple slotted flap system for aircraft employing a plurality of flap sections extending from the edge of a wing in sequential progression by means of tracks and rollers which are wholly contained within the contour of the respective flap sections. Each flap section is individually extended or retracted, allowing for several combinations of flap arrangements.

---

This invention relates to a multiple slotted air-foil flap arrangement for winged aircraft and, more particularly, to such a flap system having high lift characteristics at low speeds without, however, causing additional drag at high speeds, and which is compatible with all advanced winged aircraft including those having variable sweep wings.

It is a well-known principle that the wings of an aircraft produce aerodynamic lift by the downward deflection of the air through which the aircraft moves. Naturally, at lower flight speeds, that is, during take-off, landing and tight flight maneuvers, the amount of lift that can be generated is limited. The maximum lift is defined by the product of the wing area, the dynamic pressure $$\frac{f}{2} v^2$$

($s$=air density and $V$=velocity) and a non-dimensional lift coefficient $C_{L_{max}}$ which is a characteristic number of the chosen aircraft and its associated wing configuration. Considerable effort has been expended in order to determine the relations between the various geometric parameters and the attainable maximum lift with the results that many changes in the wing geometry have been developed for the purpose of improving the maximum lift capability at lower speed without undue sacrifices in aircraft weight, drag and fuel consumption. Foremost among such variable geometry wing devices are trailing edge flaps and it has been found that the function of these flaps is primarily based on three interrelated aerodynamic effects: (1) By providing additional camber due to their downward deflection they help to distribute the aerodynamic load more evenly along the wing chord thus lowering the adverse pressure gradient which the airflow friction layer has to overcome. It is the separation of this boundary layer on the upper wing surface at higher angles of attack that is the main limitation for the lift coefficient $C_{L_{max}}$; (2) By moving aft, forming an extension of the overhanging upper surface of the main portion of the wing they provide some effective wing area increase; and (3) By inducing more energetic air through a nozzle-like slot between the flap and the main wing section, they provide a fresh boundary layer for the upper flap surface which will not stall as easily as the boundary layer flow that has previously passed over the main wing section.

Most modern flap systems contain elements of all three of the above-mentioned concepts for achieving additional lift coefficient $C_{L_{max}}$. Also, it was soon discovered that several flaps in sequence accomplish more than a single flap and, consequently, double or triple slotted flap systems are now common-place with almost all modern aircraft. However, a good deal of complexity has accompanied this development, because such flap systems have to function differently in various flight situations in which they are needed. For example, in a landing situation where the largest maximum lift coefficient is desired, the accompanying drag increase is usually helpful in the dissipation of the aircraft kinetic energy. In the early phase of the landing the landing approach that the aircraft is kept on should be a constant flight path angle; this may be done most effectively by a flap setting that generates somewhat less drag. Although the use of some engine thrust during this phase can achieve the same result, the lower drag flap setting leaves more reserve power if an emergency waveoff maneuver is called for. During take-off, it is usually desirable to gain energy as fast as possible; therefore, flap settings which generate too much drag are not recommended. The particular combination of slack, drag and lift which is best for a specific aircraft depends on a number of factors, such as the power characteristics of the aircraft, its total load, the characteristics of the airfield, etc. Certainly, the optimum flap setting for take-off is quite different from that for landing. Still other circumstances govern the use of flaps for extending, loitering or negotiating tight maneuvers.

To accomplish the many different tasks in the most satisfactory way, the design of such multiple flap systems has become very complex. The proper relative position of succeeding flap elements, or of the first flap element to the main wing section is rather senistive and usually not the same for the different flight conditions to which it may be adapted. The mechanical realizations of these several positions normally require the combinations of translatory and rotary movements which, in turn, require support points, tracks and actuator connections outside the basic wing contour. This necessitates sizeable brackets and fairings over the flap mechanisms. This results in appreciable drag which affects high speed performance and fuel consumption. These difficulties are further compounded with the use of swept wings, particularly those having variable sweep, since the most natural arrangement of such brackets and actuating mechanisms is normal to the flap leading or trailing edges and, therefore, at an awkward angle to the air flow. It is the purpose of this invention to overcome the above-mentioned difficulties.

It is the prime object of this invention to provide a multiple slotted flap system for winged aircraft which employs a plurality of basically similar flap elements each of which has assigned only a single movement between two positions, one of which is the full retraction into the next upstream flap section and the other the fully extended position so that the various specific flap settings for landing, take-off, etc. are established by combinations of the two end positions of the flap elements.

It is a further object of this invention to provide a multiple slotted flap system for winged aircraft in which the support and drive mechanism for each flap section is self-contained within the contour of the flap sections.

It is still yet another object of this invention to provide a multiple slotted flap system for winged aircraft in which the individual flap sections are sized in an essential geometric progression, and in which the flap sections are essentially similar to each other in shape and are each moved on single tracks provided in each flap section.

According to one embodiment utilizing the principles of this invention, there is provided a series of flap sections or segments each being essentially similar in shape and sized in an essentially geometric progression. Each of the flap elements is moved on single tracks of arcuate shape from a retracted position to a fully extended position with each of the flap sections moved through a moderate angular travel with respect to each other and without intermediate positions other than during the extension process. Further, each of the flap sections is moved one at a time in any desired succession such that the first movement brings about a single slotted arrangement with either a small, medium or large chord length, the second movement brings about a double slotted arrangement with possible choice of chord length, and the third movement brings about a triple slotted flap arrangement, each successive movement of a flap section bringing about an equal increment of total flap deflection angle. The flap support structure and drive mechanisms are completely housed within the contour of the air-foil shape of the combined flap structure with the drive mechanism and support structure for one flap section being located in the flap section directly preceding it.

Further objects and advantages will become apparent from a study of the following specification and drawings, in which:

FIG. 1a is an enlarged view of FIG. 1;

FIG. 1b is an enlarged view of FIG. 1a;

FIG. 2 is a cross-sectional view of showing the multiple slotted flap system in its fully retracted position;

FIG. 3 is a sectional view showing the individual flaps in their fully extended position;

FIG. 4 is a cross-sectional view along line 4—4 of FIG. 2; and

Figure 1:
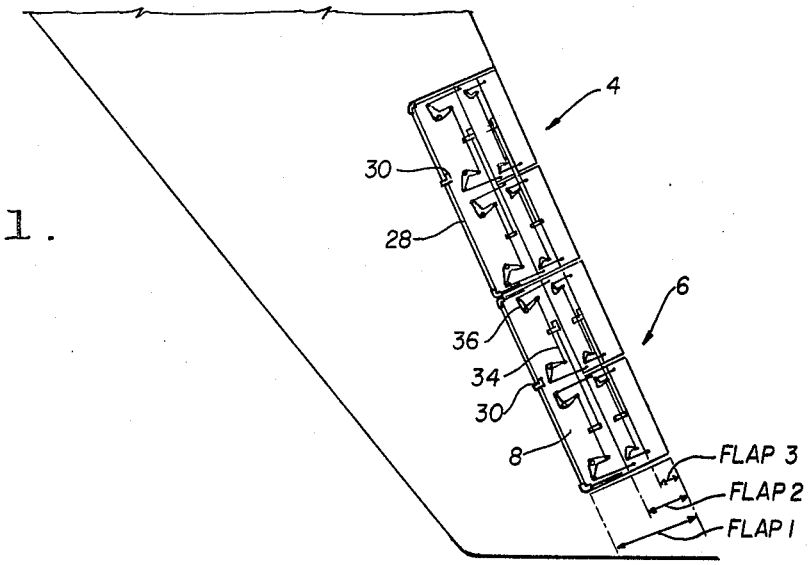
FIG. 1 is a perspective view of a portion of an aircraft having a swept wing and being equipped with the multiple slotted flap system according to this invention.

Referring now to FIG. 1, there is shown generally a typical swept wing 2, the trailing edge of which is equipped with the multiple slotted flap system according to this invention. The flaps are shown in their retracted or closed position. In this case the flaps are divided into an inboard flap section 4 and an outboard flap section 6. From an examination of FIGS. 2 and 3, it will be seen that the main wing 2 has extending from its trailing edge a track member 8. The track member 8 is of a given arcuate length and is composed of C-shaped members 10 positioned in a back-to-back relationship and forming a generally I-shaped member, as best seen in FIG. 4. A pair of rollers 12 are guided within each of the tracks 8. The rollers 12 are supported by a triangular-shaped truss member 14 which, in turn, has a flange 16 welded to a bracket 18 which is integral with the flap section 20 in which it is located. The truss member 14 at its lower end supports a suitable bolt member 22 which travels or rides on a jack screw member 24 which is connected at one end to a gear box member 26. The jack screw 24 is caused to rotate by a drive torque shaft 28 connected to the gear box 26 as best shown in FIG. 1. For driving the torque shaft 28, there is provided in each inboard flap section 4 and outboard flap section 6 a suitable drive motor and reduction gear mechanism 30 which is located within the contour of the wing 2.

The flap section 20 is also provided with a drive motor and gear box mechanism 32 for supporting and driving a jack screw 34, the free ends of which are coupled to a pair of bell crank members 36, as best shown in FIGS. 1a and 1b. The bell crank members 36 are pivotally supported in the upper section of the flap 20 and their free ends are pivotally connected to a push rod 38 which, in turn, is connected to a truss member 40 having supported thereon a pair of rollers 42 which ride in one of the tracks 44 which is similar to the track members 8 in the main wing 2. The truss member 40 is secured to its associated flap section 46 in the same manner as the truss member 14 is secured to the flap section 20. The flap section 46 is extended from the flap element 20 by actuating the drive motor 32 which, in turn, rotates the jack screw member 34 causing the bell crank members 36 to pivot and hence impart a translatory motion to the push rod 38 which causes the rollers 42 to ride along the length of the track 44. The extent of travel of the rollers along their respective tracks is determined by the amount of angular motion imparted to the jack screws associated therewith. For this purpose a suitable timer mechanism can be employed to control the amount of time the drive motors are actuated or, alternatively, a suitable cut-off means may be provided to de-energize the drive motors in response to a limit switch means (not shown) which may be suitably positioned at the end of each jack screw. Also, the tracks 8 may be provided with suitable abutments at the rearward ends thereof to act as a stopping means for the rollers. A third flap section 48 is supported in the same manner that the flap section 46 is supported from flap section 20, as just described.

It should be understood that the driving mechanism, above described, for imparting motion to the flap members 20, 46 and 48 need not be limited by the specific embodiment shown. It is contemplated that other designs employing track and roller arrangements could be employed, the important condition being that the entire motive system be completely housed within the contour of each of the flap sections.

The flap sections 20, 46 and 48 are sized in an essentially geometric progression, with a factor 0.6 to 0.4. For example, if the factor 0.5 were chosen, the chord length from its leading edge to the wing trailing edge of the first flap would be twice that of the second and the second flap would have twice the chord length of the third and so on. The flap sections are moved through a moderate angular travel, for example 25°, with respect to each other, and such that each forms with the other an optimum slot geometry. Further, the flap elements are moved one at a time, in any desired succession, such that the first movement brings about a single slotted arrangement, the second movement brings about a double slotted arrangement, and the third a triple slotted arrangement.

Figure 5:
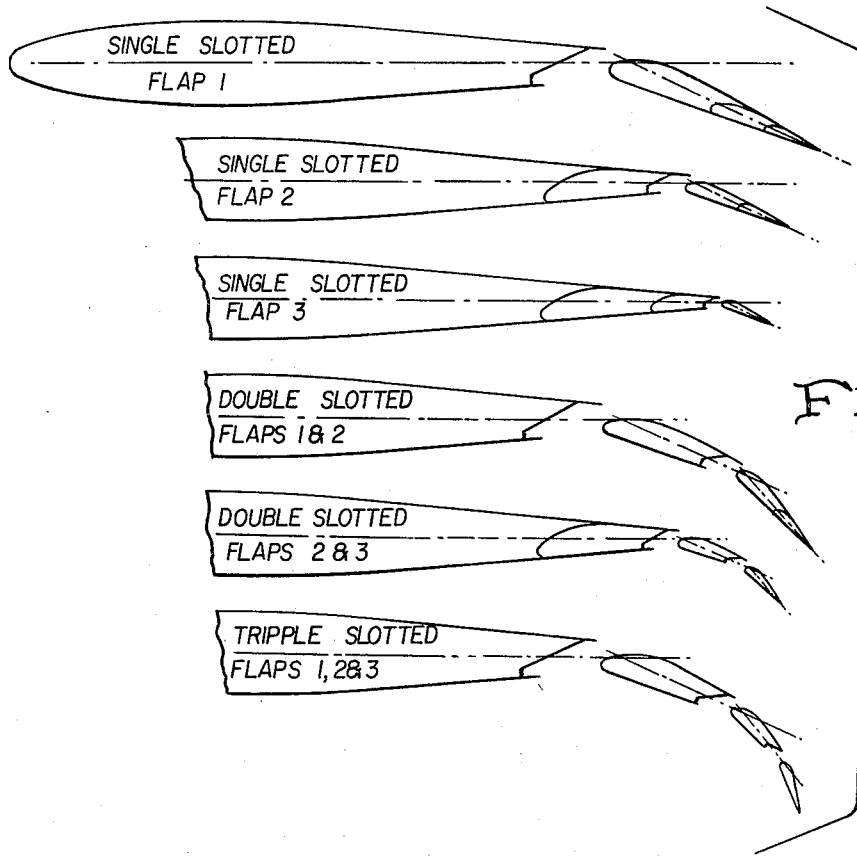
FIG. 5 is a schematic drawing illustrating the various flap positions with the system according to this invention.

As shown in FIG. 5, the triple slotted flap system according to this invention allows for six intermediate flap arrangements between the fully retracted and the all extended positions. The aerodynamic characteristics of a flap system are dependent on the overall aircract and wing shape; thus, in a statistical evaluation of multiple slotted flaps, the arrangement according to this invention is effective in achieving a desirable lift coefficient $C_{L_{max}}$. As shown, there are three possible arrangements for a single slotted system according to this invention, two possible arrangements for a double slotted system, and a single triple slotted system. Tests on a single slotted system show usually a very linear $C_{L_{max}}$ increase with flap deflection up to a deflection angle between 20° and 30°. An increase continues somewhat beyond this deflection, but at a much slower rate and with a sizeable drag increase. This is an indication that the flow begins to separate from the flap at this deflection angle. Near this angle, a second slotted flap section with some additional deflection is desirable; again, tests show that this additional deflection, in turn is less effect about 20° to 30° so that here again a third slotted segment will be more desirable than increased deflections of the first and second flap sections.

That which is claimed is:

1. A multiple slotted flap system for an aircraft having a wing, the combination comprising, a plurality of flap members forming an edge portion of said wing and extending therefrom in sequential progression, said flap members having a track means positioned within the contour thereof, at least one pair of bell crank members pivotally supported in said flap members, one pair of ends of said pair of bell crank members connected to a drive screw actuating means, the other ends of said pair of bell crank members connected to a push rod means having supported thereon a roller means for engaging said track means for moving said flap members along their respective track means to a first extended position and a second retracted position.

2. In a multiple slotted flap system for an aircraft having a wing, the combination comprising, a plurality of flap members forming an edge portion of said wing and extending therefrom in sequential progression, said flap members having a track means positioned within the contour thereof, a drive screw means positioned in said flap members, said drive screw means connected to one end of a bell crank means pivotally supported within said flap members, the other end of said bell crank means connected to a push rod means, said push rod means supporting a roller means, said roller means engaging said track means and driving means for actuating said drive screw means for moving said flap members along their respective track means to a first extended position and a second retracted position.

References Cited

UNITED STATES PATENTS

| 2,524,605 | 10/1950 | Servanty | 244—42 |
| 2,146,014 | 2/1939 | Grant | 244—42 |
| 2,404,956 | 7/1946 | Gouge | 244—42 |

FOREIGN PATENTS 866,492  10/1943  France.

M. BUCHLER, Primary Examiner

J. L. FORMAN, Assistant Examiner